Aug. 31, 1948.  J. A. PELLETTERE  2,448,118
PULSATION ABSORBER
Filed May 18, 1945

Inventor
JOSEPH A. PELLETTERE
By G. M. Houghton
his Attorney

Patented Aug. 31, 1948

2,448,118

UNITED STATES PATENT OFFICE 2,448,118

PULSATION ABSORBER

Joseph A. Pellettere, Pittsburgh, Pa., assignor to Gulf Oil Corporation, Pittsburgh, Pa., a corporation of Pennsylvania Application May 18, 1945, Serial No. 594,565

5 Claims. (Cl. 138—26)

This invention relates to pulsation absorbers useful to cushion or absorb shocks such as occur in transfer lines and equipment for moving liquids which are subject to flow regulation, quick shut-off through valve actuation, or to the intermittent action of reciprocating pumps, etc.

It is well known that liquid systems including pipes and conduits, through which liquid is caused to flow, are sometimes subjected to terrific strains when sudden changes in the velocity of the liquid occur. Liquids being substantially incompressible, the strain often manifests itself by a sharp, audible knock or series of knocks, sometimes referred to as "liquid hammer." The pressures involved are frequently tremendous and may cause leakage or fracture of the pipe at otherwise tight, strong joints. Localized crystallization of the metal of the pipe or metal fatigue and final rupture may result from "liquid hammering." Less damaging perhaps, but nevertheless aggravating is the irregular flow of liquids which sometimes occurs in these systems. The flow may be said to be jerky, i. e. liquid will discharge through an open valve with a spurt at high velocity and then, as suddenly, the flow will drop off, to a dribble in extreme cases.

In some systems these defects may be satisfactorily cured by the provision of a simple air dome or expansion chamber connected in series in the line. The piped liquid rises and falls in the chamber to compress and expand entrapped air with increase and decrease of pressure in the line. In such installations, smoothness of flow as well as avoidance of shock are usually wanted.

In still other systems it is more desirable to use a different form of absorber or shock cushioning device, and many different forms of these devices have heretofore been developed.

In general, these different forms are designed to meet special requirements of particular installations with the result that many of them are complicated in structure and operation. Absorbers heretofore devised for more universal application tend toward unique and special construction, requiring especially fabricated parts that complicate replacement and repair.

It is an object of the present invention to provide a pulsation absorber for piped liquid installations which shall be simple in construction and design and which may be fabricated from materials readily available to the manufacturer or user of the device.

A further object of the invention is the provision of a shock absorber that employs as an expansible or elastic element a section of ordinary rubber, pressure hose, such as is commonly used for short, fluid transfer in and around pumping installations and in power plants and the like.

A still further object of the invention is the provision of such a device that is readily adapted for manufacture in different sizes to handle greater or lesser volumes of liquid at high or low pressures and which may be easily and inexpensively repaired.

Other objects and advantages of the invention will be apparent from the following description when read in light of the accompanying drawings. In the drawings, wherein, for purposes of illustration, there is shown a preferred embodiment of the invention;

Figures 1, 2:
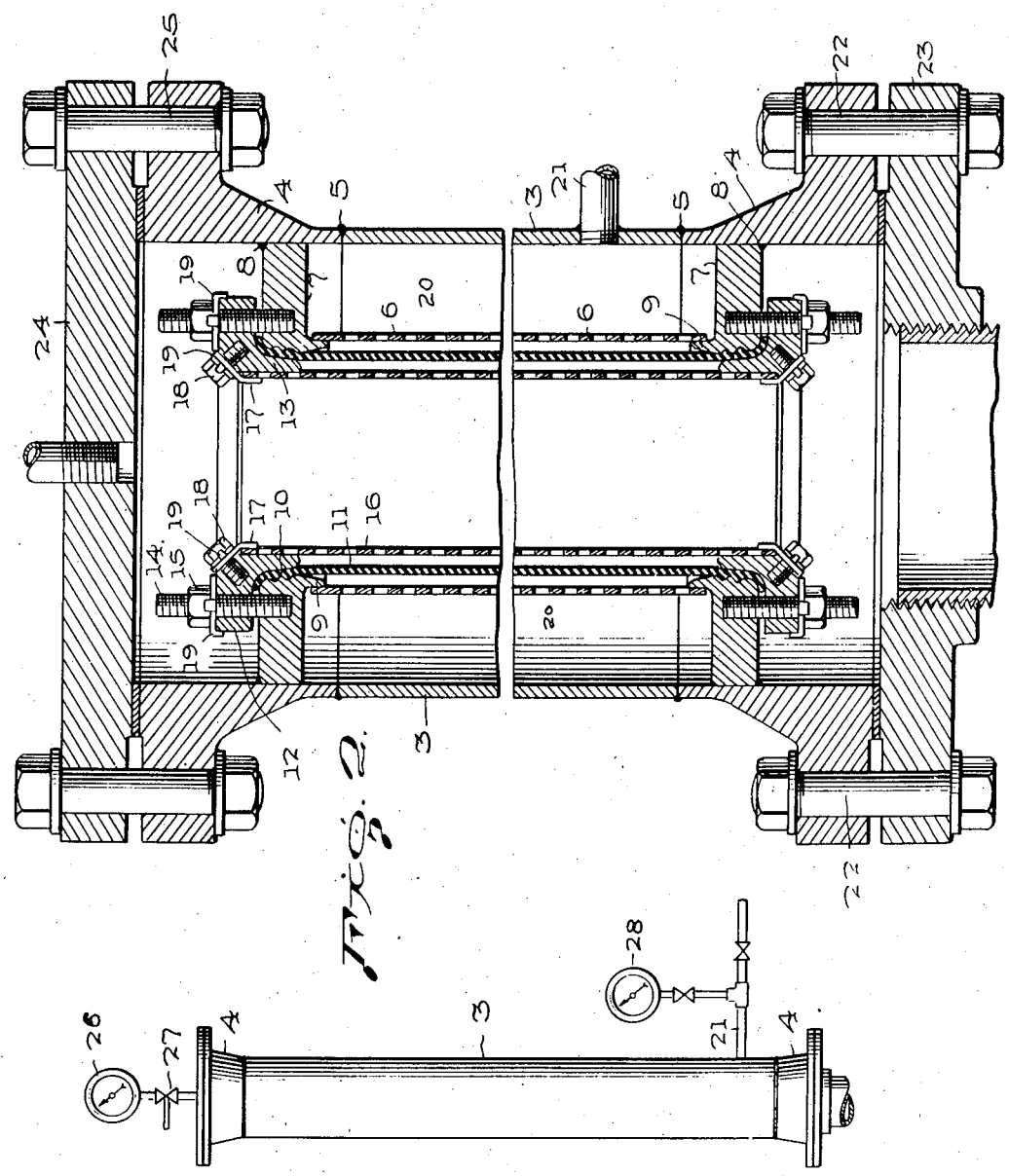
Fig. 1 is a view in side elevation of the absorber.
Fig. 2 is a detail longitudinal, sectional view of the absorber, with the central portion removed.

Referring to the drawings wherein for purposes of illustration like numerals indicate corresponding parts throughout the two views, 3 is a section of pipe of suitable diameter and length and provided at its ends with flanges 4. The flanges may be of the conventional type threaded on to the ends of the pipe or they may be modified slightly as shown, for welding as at 5 to the pipe to secure a positively leak proof joint. The diameter and length of the pipe used in the absorber may be identical with the size of a standard length section of pipe used in the system in which the absorber is to be used or it may be larger or smaller as conditions warrant. Thus for a 10 inch liquid transport pipe line the diameter of pipe used for the absorber may be 10 inches and its length 6 or 7 feet or more commensurate with the pressure characteristics and flow of oil in the system.

Positioned concentrically within pipe 3 is a section of perforated tubing 6 provided with imperforate flanges 7 at each end which are seal welded as at 8 to the inside walls of flanges 4. Perforated tube 6 and flanges 7 may, advantageously, be constructed as a unit by slipping the ends of tube over upstanding cylindrical projections 9 provided on flanges 7 and welding the ends of the tube to the projections. The unit may then be inserted in position in pipe 3 and seal welded to flange 4 through the mouth of the flanges as described. If desired however, the ends of tube 6 may be bolted instead of welded to projections 9 or the joint may be simply a slip joint, since pipe 6 will be properly centered and held in position in pipe 3 by the flanges and their projections 9 respectively.

As shown, the entrance to the interior of perforated pipe 6 through the flanges 7 is rounded off as at 10 and knurled or grooved as shown to provide a tight non-slip friction joint with the ends of a section of rubber hose 11. The ends of the hose are clamped tightly to flanges 7 by means of a ferrule-like member 12 provided with a projection or shoulder 13 which is adapted to fit within the end of the rubber hose. Clamping ring 12 is bolted to flange 7 by means of stud bolts and nuts 14 and 15 respectively. In this position the ends of the hose are curled back upon the rounded entrances to the openings in flanges 7 and the rubber of the hose forced under clamping pressure into friction grooves.

Positioned concentrically within the section of hose, by means of the flanges 13 on ferrule-like members 12 is a second perforated tube 16 which is adapted for a sliding fit within the ferrule-like members. Tube 16 is held against longitudinal movement by means of clips 17 which are secured to the members by means of stud bolts 18. Both stud bolts 18 and nuts 15 are provided with lock washers 19 to prevent accidental loosening.

As so far described it will be seen that perforated tubes 6 and 16 are held spaced from rubber hose 11 a distance equal to thickness of projections 9 and shoulders 13 respectively. Also that nuts 15 and bolts 18 are readily accessible through flanges 4 for removal and replacement of the rubber hose when necessary. This construction results in pipe 3, flanges 7, and rubber hose 11 defining a sealed, elongated, annular shaped chamber 20. Chamber 20 is adapted to receive air or other gas, under pressure through valved pipe 21 which may be welded in an opening provided therefor in pipe 3. Advantageously pipe 21 is provided with a pressure gage 28 disposed between the valve and the chamber. The purpose of chamber 20 is for applying an expansible fluid pressure to the outside of the rubber hose for counter balancing average fluid pressures within the hose. The purpose of perforated cylinders 6 and 16 is to protect the hose from excessive strain both from liquid under pressure inside the hose and from the pressure of the compressed gas on the outside of the hose. The perforated cylinders limit the extent to which the hose may be blown up or collapsed.

In use, bottom flange 4 of the absorber may be secured by means of bolts 22 to the flange of a T joint 23 in a liquid system to be protected by the absorber, while top flange 4 is provided with a cover or header 24 secured thereto by bolts 25. Advantageously header 24 may be provided with a pressure gage 26 and a bleed-off valve 27.

Pressure liquid from the system enters the absorber through lower flange 4 and passes upwardly through rubber hose 11 into upper flange 4. Any gas entrapped in the top of the absorber may be bled off by means of valve 27. Noting the pressure of the liquid in the absorber as indicated by gage 26, gas under pressure is admitted to chamber 20 through pipe 21 until the gas pressure in the chamber substantially balances the average liquid pressure in the hose. This may be determined by pressure gage 28. The fluid pressure on the inside and outside of the hose being substantially balanced, the walls of the hose will normally occupy a mid position between perforated tubes 6 and 16. Should there then occur a sudden increase in pressure on the liquid in the system it will be expended in compressing the gas in chamber 20 through the expansion or "blowing up" of the elastic rubber hose 11 against the pressure of such gas.

Sudden shocks in a liquid transfer line, such as occur when a valve is adjusted or closed are absorbed or cushioned by the device to the point where they are no longer objectionable.

The absorber described is particularly useful in that it is of simple, rugged construction and may be fabricated from materials readily available. The structure is particularly adapted for use with rubber or expansible composition hose of conventional size and to this extent, when replacement of the hose is advisable, a new section of hose may be cut from stock lengths.

The arrangement of parts permits easy assembly and disassembly of the absorber for repair. For instance to replace the hose the absorber is disconnected from the system and cap 24 removed from the casing. Nuts 15 and bolts 18 are then readily accessible through the ends of the casing. Bolts 18 are first removed to free perforated cylinder 16 and then nuts 15 are removed to free the ends of the hose. The parts are replaced, of course, in reverse order.

What I claim is:

1. In a pulsation absorber, a casing, spaced, internally extending flanges secured to the circumferential wall of the casing, an expansible member, means for securing the ends of the expansible member to the flanges and separate, spaced means carried by the securing means and flanges respectively and spaced from both the expansible member and the circumferential wall of the casing for limiting lateral flexure of the expansible member in opposite directions.

2. A pulsation absorber for liquid transfer systems, comprising a casing provided with inwardly extending, annular flanges adjacent each end, an expansible tubular member, means for detachably securing the ends of the expansible member to the flanges to provide a sealed, annular gas chamber in said casing, a perforated, substantially rigid cylinder, means for detachably securing the cylinder to said securing means in spaced, substantially coaxial alignment with the expansible member to limit lateral contraction of the expansible member when under pressure of gas in said chamber, and a perforated substantially rigid cylinder surrounding the expansible member in substantially coaxial alignment therewith and spaced therefrom by the annular flanges to limit lateral expansion of the expansible member under pressure of liquid in the member.

3. A pulsation absorber for liquid transfer systems comprising, a tubular casing provided with spaced, inwardly extending annular flanges, terminating centrally in opposed annular ring-shaped projections extending into the space between the flanges, an expansible tubular member disposed between the flanges, the ends of said member extending through the openings in said flanges, detachable securing means adapted to fit within the ends of the expansible member and flare said ends outwardly into tight frictional engagement with the annular flanges, means spaced from said expansible member by said annular ring-shaped projections for limiting lateral expansion of said member, means for limiting lateral contraction of the expansible member and means for detachably securing said last named means to said detachable securing means.

4. In a pulsation absorber, a casing provided internally with spaced annular flanges defining a central opening, clamping rings extending into the openings so defined and fastened to said flanges by means accessible from the ends of the casing, an elastic tube secured to said annular flanges by said clamping rings, an inner perforated guard member removably secured to said clamping rings and spaced thereby from said elastic tube, and an outer perforated guard member mounted in spaced relation to said elastic tube by means formed as parts of said annular flanges.

5. A pulsation absorber for liquid transfer systems comprising a tubular casing provided with a removable closure at one end and means at the other end for attaching the casing to the system for receiving liquid therefrom, a pair of spaced annular flanges projecting inwardly from the wall of the casing and terminating in oppositely disposed ring-shaped projections directed toward each other, a pair of angular clamping rings removably secured to said flanges and having portions thereof extending within the ring-shaped projections of said flanges, an elastic tube clamped between said flanges and clamping rings, a substantially rigid perforated tube surrounding said elastic tube and concentrically spaced therefrom by the ring-shaped projections of said flanges, a second substantially rigid perforated tube mounted within said elastic tube and concentrically spaced therefrom by the portions of the angular clamping rings extending within the ring-shaped projections of said flanges, and means for securing said second perforated tube at its ends to said clamping rings.

JOSEPH A. PELLETTERE.

REFERENCES CITED

The following references are of record in the file of this patent:

UNITED STATES PATENTS

| Number | Name | Date |
|---|---|---|
| 2,290,377 | Knauth | July 21 1942 |